RETRACTABLE CENTER DISC FOR PHONOGRAPH TURNTABLE

Filed Feb. 19, 1952 2 Sheets-Sheet 1

INVENTOR.
Robert N. Thomas
BY
Frease, Bishop & Hamilton
ATTORNEYS

July 16, 1957 R. N. THOMAS 2,799,509

RETRACTABLE CENTER DISC FOR PHONOGRAPH TURNTABLE

Filed Feb. 19, 1952 2 Sheets-Sheet 2

INVENTOR.
Robert N. Thomas
BY
Frease, Bishop & Hamilton
ATTORNEYS

United States Patent Office 2,799,509

Patented July 16, 1957

2,799,509

RETRACTABLE CENTER DISC FOR PHONOGRAPH TURNTABLE

Robert N. Thomas, Alliance, Ohio, assignor, by mesne assignments, to The Alliance Manufacturing Company, Division of Consolidated Electronics Industries Corporation, Alliance, Ohio, a corporation of Delaware Application February 19, 1952, Serial No. 272,311

10 Claims. (Cl. 274—39)

Figures 1, 2, 3:
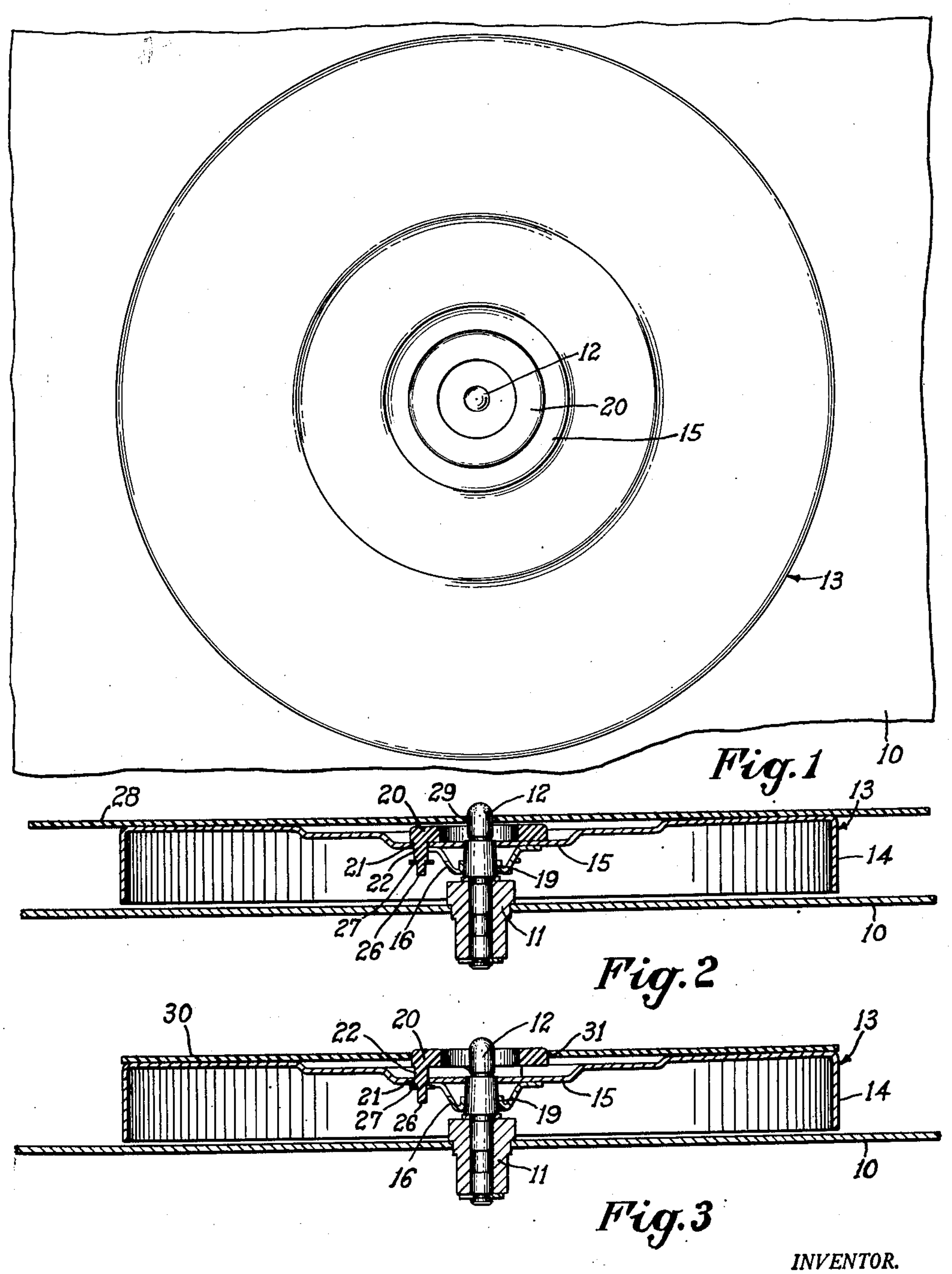

The invention relates to phonograph turntables, and more particularly to a turntable upon which records having either the conventional small center hole or the more modern larger center hole may be correctly centered thereon for playing.

As is well known, the older type of phonograph record adapted for playing at 78 R. P. M., as well as those made for playing at 33⅓ R. P. M. are provided with a small center hole of approximately one-fourth inch diameter adapted to receive the conventional turntable spindle.

More recently records are being produced for playing at 45 R. P. M., and those records are provided with a much larger center hole of approximately one and one-half inch diameter. Phonographs built especially for playing these 45 R. P. M. records are provided with a turntable having a spindle or post of approximately one and one-half inches, and the turntable is operated at a speed of 45 R. P. M.

Three speed phonograph motors are now being supplied to the trade, having means for selectively rotating the turntable at 78 R. P. M., 33⅓ R. P. M. or 45 R. P. M. as desired. In order to adapt such phonographs for playing 45 R. P. M. records a removable disc of approximately one and one-half inches in diameter is slipped over the turntable spindle. An alternate means has been to snap into the large center hole of these 45 R. P. M. records, an adapter disc having a center hole to receive the conventional turntable spindle.

There are disadvantages in both of those methods of adapting the 45 R. P. M. records to the conventional turntable. The first method is open to the objection that the loose or removable center piece may be readily lost, and the objection to the second method is that a separate adapter disc must be purchased for each 45 R. P. M. record.

The object of the present invention is to provide a phonograph turntable adapted for playing conventional records having small center holes, and having means thereon for readily converting the turntable for the playing of records having large center holes.

Another object is to provide a turntable having the conventional spindle adapted to be received into the small center holes of conventional records, and provided with a retractable center disc adapted to receive records provided with large center holes.

A further object is to provide such a turntable having a recessed central portion within which the retractable center disc is normally located below the effective plane of the turntable, means being provided for elevating the retractable center disc above the effective plane of the turntable.

A still further object is to provide a turntable with a retractable center disc having cam means thereon for raising the center disc above the effective plane of the turntable so as to adapt the turntable for use with 45 R. P. M. records.

Another object is to provide such a turntable having arcuate slots therein, the retractable center disc having depending cam lugs thereon operatively engaging said slots.

A further object of the invention is to provide a turntable having a retractable center disc which may be raised to operative position by turning the disc in counterclockwise direction relative to the turntable.

A still further object is to provide such a device in which the retractable center disc may be instantly elevated to operative position by a mere touch of the operator's fingers while the turntable is rotating.

Figure 4:
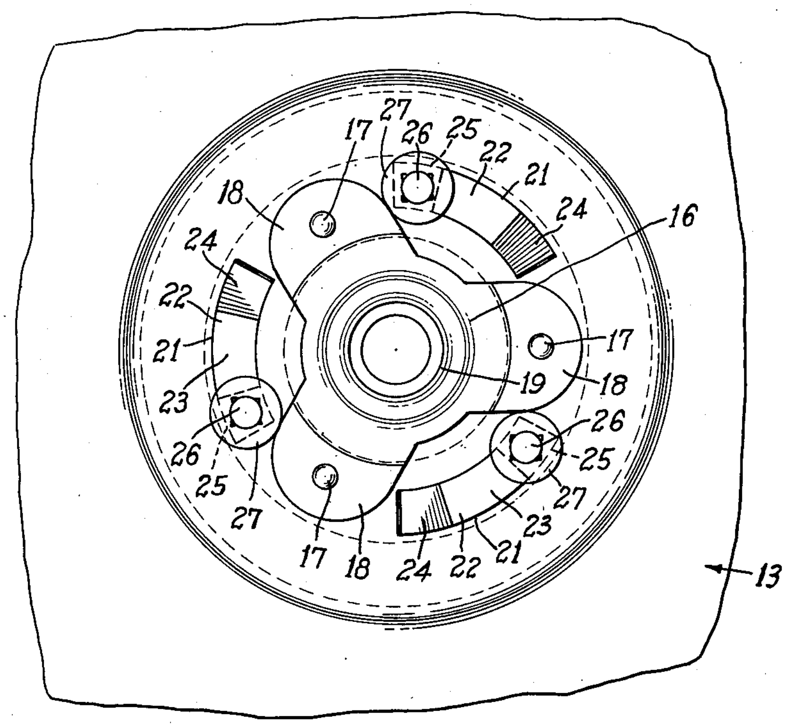
Figure 5:
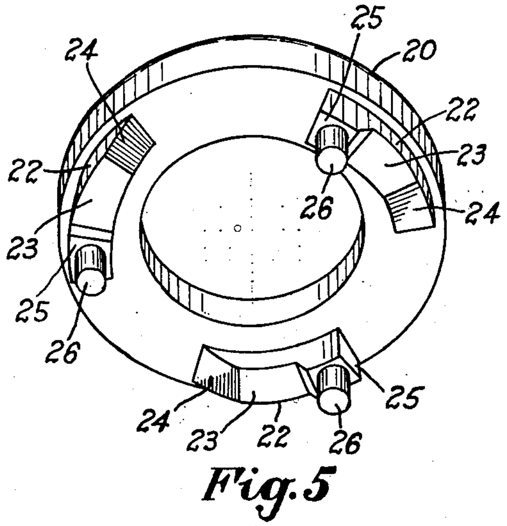
Figure 6:
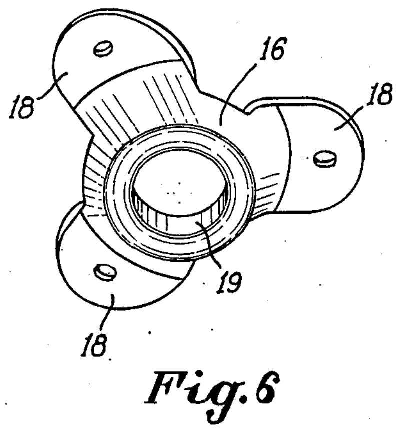

The above objects together with others which will be apparent from the drawings and following description, or which may be later referred to, may be attained by constructing the improved turntable with retractable center disc in the manner hereinafter described in detail and illustrated in the accompanying drawings, in which:

Fig. 1 is a top plan view of a turntable provided with a retractable center disc embodying the invention;

Fig. 2 a vertical, sectional view of the turntable showing the center disc in retracted position;

Fig. 3 a view similar to Fig. 2, showing the center disc in the raised or operative position;

Fig. 4 an enlarged, bottom plan view of the central portion of the turntable showing the arcuate slots therein and the cam lugs of the retractable center disc located therethrough, and also showing the support;

Fig. 5 an enlarged, detached, perspective view of the retractable center disc; and Fig. 6 an enlarged, detached, perspective view of the support.

Referring now more particularly to the embodiment of the invention illustrated in the drawings, in which similar numerals refer to similar parts throughout, the usual mounting plate is indicated at 10, having a bearing 11 therein for the conventional turntable spindle 12.

The turntable, indicated generally at 13, may be provided with the usual annular rim flange 14, and, for the purpose of the invention, is provided with the central recessed portion 15, to the underside of which is attached the support 16, as by the rivets 17 located through the ears 18 thereof. The support has the usual central opening 19 which receives the spindle 12 upon which the turntable is thus rotatably mounted.

The retractable center disc 20, which may be formed of plastic or other suitable material, is concentrically mounted upon the upper side of the turntable, at the recess 15 therein.

Arcuate slots 21 are formed in the recessed portion 15 of the turntable and are concentrically located therein. Correspondingly shaped arcuate lugs 22 are formed upon the underside of the retractable center disc 20, each lug having an intermediate flat under surface 23 and terminating at one end in the upwardly inclined cam surface 24.

At the opposite end of each lug 22 is formed a depending, substantially square boss 25, having a depending stud 26 thereon. For the purpose of preventing the retractable center disc from becoming detached from the turntable, a collar 27, which may be in the form of a metal washer, is fixed upon each stud 26.

In the normal, or retracted, position of the retractable center disc 20, as shown in Fig. 2, this center disc is received within the recess 15 of the turntable, the cam lugs 23 thereon being located through the arcuate slots 21 in the turntable, so that the center disc is located below the effective plane of the turntable, whereby a conventional record, as indicated at 28, having the small center hole 29 to receive the spindle 12, may be placed upon the turntable for playing.

When it is desired to play a 45 R. P. M. record, having large center hole, the retractable center disc may be elevated by turning it counterclockwise relative to the turntable, so that the inclined cam surfaces 24 of the cam lugs 22 will ride upwardly upon the adjacent ends of the arcuate slots 21 in the turntable, and the flat under surface 23 of said cam lugs will ride over the top surface of the recessed portion 15 of the turntable, elevating the retractable center disc 20 above the top surface of the turntable, as shown in Fig. 3, whereby a 45 R. P. M. record, as indicated at 30, may be placed upon the turntable, the large center hole 31 of the record receiving the center disc 20.

With this construction, it will be apparent that when the phonograph motor is operating, rotating the turntable in clockwise direction as in conventional practice, a slight touch of the operator's fingers to the retractable center disc 20 will cause the center disc to quickly rise to operative position, thus instantly converting the turntable for use with 45 R. P. M. records.

When it is desired to again play a 78 R. P. M. or 33⅓ R. P. M. record having the conventional small center hole, it is only necessary to give the retractable center disc a slight turn in clockwise direction, causing the cam lugs 22 thereof to ride off of the top surface of the turntable and into the arcuate slots 21, lowering the retractable center disc into the recess 15 of the turntable, below the effective surface of the turntable.

From the above it will be evident that a simple, inexpensive, efficient and easily operated means is provided for readily adapting a phonograph turntable for use with either conventional or 45 R. P. M. records.

It will also be seen that this device overcomes the objections and disadvantages of present practice, as it eliminates any loose or removable parts which may become lost, and obviates the necessity of purchasing a separate adapter disc for each 45 R. P. M. record.

In the foregoing description, certain terms have been used for brevity, clearness and understanding, but no unnecessary limitations are to be implied therefrom beyond the requirements of the prior art, because such words are used for description purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A phonograph turntable, a spindle upon which the turntable is journalled, a central recess in the turntable, a retractable center disc concentrically located in said recess, there being concentric arcuate slots in the recessed portion of the turntable, and cam lugs depending from the center disc and located in said slots, each cam lug having an inclined end portion adapted to ride over the adjacent end of the corresponding slot causing the center disc to move upwardly out of said recess when it is rotated relative to the turntable, and a flat portion adapted to ride upon the upper surface of the turntable.

2. A phonograph turntable, a spindle upon which the turntable is journalled, a central recess in the turntable, a retractable center disc concentrically located in said recess, there being concentric arcuate slots in the recessed portion of the turntable, and cam lugs depending from the center disc and located in said slots, each cam lug having an inclined end portion adapted to ride over the adjacent end of the corresponding slot causing the center disc to move upwardly out of said recess when it is rotated relative to the turntable, and a flat portion adapted to ride upon the upper surface of the turntable, a depending stud at the other end of each cam lug, and a shoulder upon said stud for preventing removal of the center disc from the turntable.

3. A phonograph turntable, a spindle upon which the turntable is journalled, a central recess in the turntable, a retractable center disc comprising a ring concentrically surrounding the spindle within said recess and normally located below the plane of the turntable, there being arcuate concentric slots in the recessed portion of the turntable, arcuate cam lugs depending from the center disc and operatively located in and extending below said slots causing the center disc to move upwardly out of said recess when it is rotated relative to the turntable, and means on said lugs at a spaced distance beneath and vertically engageable with said turntable for preventing removal of the center disc from the turntable, whereby rotation of the center disc relative to the turntable will elevate the center disc above the plane of the turntable.

4. A phonograph turntable, a spindle upon which the turntable is journalled, a retractable center disc concentrically and rotatably located upon the turntable, cooperating means upon the turntable and the center disc limiting rotary movement of the center disc in opposite directions, and cam means upon the center disc cooperating with the turntable for causing vertical movement of the center disc when it is rotated relative to the turntable.

5. A phonograph turntable, a spindle upon which the turntable is journalled, a central recess in the turntable, a retractable center disc concentrically and rotatably located in said recess, cooperating means upon the turntable and the center disc limiting rotary movement of the center disc in opposite directions, and cam means upon the center disc cooperating with the turntable for causing the center disc to move upward out of said recess when it is rotated relative to the turntable.

6. A phonograph turntable, a spindle upon which the turntable is journalled, a retractable center disc concentrically and rotatably located upon the turntable, depending lugs upon the center discs, means upon the turntable cooperating with said lugs for limiting rotary movement of the center disc in opposite directions, and cams means upon said lugs cooperating with the turntable for causing vertical movement of the center disc when it is rotated relative to the turntable.

7. A phonograph turntable, a spindle upon which the turntable is journalled, a central recess in the turntable, a retractable center disc concentrically and rotatably located in said recess, depending lugs upon the center disc, means upon the turntable cooperating with said lugs for limiting rotary movement of the center disc in opposite directions, and cam means upon said lugs cooperating with the turntable for causing the center disc to move upward out of said recess when it is rotated relative to the turntable.

8. A phonograph record turntable having an integral top surface, a centrally disposed depressed portion and a central aperture for receiving a small diameter spindle, a plurality of arcuate slots in said turntable surrounding said aperture, a large diameter spindle comprising a disk having a central aperture therein of sufficient size to accommodate said small diameter spindle, said disk being provided with a plurality of depending lugs said lugs being smaller than said slots to permit said lugs to enter said slots to thereby lower said disk with respect to said turntable, said lugs being provided with depending studs which are shorter than said lugs along the arc of said slots to provide platforms on the lower surface of said lugs adjacent said studs so that when said disk is raised to withdraw said lugs from said slots, said disk can be rotated to cause said platforms to overlie said turntable.

9. In combination, a phonograph turntable having an integral top surface extending inwardly from the periphery thereof, a relatively large diameter record-engaging spindle, a depressed portion of said turntable in which said spindle is disposed, means interengageable between the depressed portion of said turntable and said spindle, whereby said spindle may be adjusted in elevation, said means comprising arcuate slots in said turntable and elevating members upon said large diameter spindle extending through said slots and shiftable therein to permit rotation of and raising and lowering of said large diameter spindle, said spindle being depressed at one angular position and elevated at another angular position, said spindle in its depressed position being no higher than said record supporting surface and in its elevated position extending above said surface, and a relatively small diameter spindle extending above the relatively large diameter spindle.

10. A combination as defined in claim 9, wherein said elevating members are formed integral with said spindle and comprising a plurality of arcuate lugs of slightly less length than the length of said slots, said lugs each having an inclined surface at one end thereof and a vertical surface at the other end thereof, said inclined surfaces facilitating the elevation and depression of the spindle on rotary movement thereof, and elements adjacent said vertical surfaces for preventing withdrawal of the spindle from said slots.

References Cited in the file of this patent

UNITED STATES PATENTS

| | | |
|---|---|---|
| 1,390,546 | Richman | Sept. 13, 1921 |
| 1,440,276 | Cerveny | Dec. 26, 1922 |
| 1,915,090 | Hammond | June 20, 1933 |
| 2,230,003 | Mitchell | Jan. 28, 1941 |
| 2,416,583 | Hartley et al. | Feb. 25, 1947 |
| 2,693,364 | Chalfin | Nov. 2, 1954 |

FOREIGN PATENTS

| | | |
|---|---|---|
| 355,621 | Great Britain | Aug. 27, 1931 |